United States Patent
Mack-Crane et al.

(10) Patent No.: US 10,110,491 B2
(45) Date of Patent: Oct. 23, 2018

(54) METHOD AND SYSTEM FOR SELECTIVE ROUTING OF DATA PACKET TRAFFIC

(71) Applicant: CORSA TECHNOLOGY INC., Ottawa, Ontario (CA)

(72) Inventors: Thomas Benjamin Mack-Crane, Downers Grove, IL (US); Stacey Sheldon, Ottawa (CA)

(73) Assignee: CORSA TECHNOLOGY INC., Ottawa (CA)

( * ) Notice: Subject to any disclaimer, the term of this patent is extended or adjusted under 35 U.S.C. 154(b) by 91 days.

(21) Appl. No.: 15/418,051

(22) Filed: Jan. 27, 2017

(65) Prior Publication Data
US 2017/0222926 A1    Aug. 3, 2017

Related U.S. Application Data

(60) Provisional application No. 62/288,051, filed on Jan. 28, 2016.

(51) Int. Cl.
*H04L 12/741* (2013.01)
*H04L 12/721* (2013.01)

(52) U.S. Cl.
CPC ............ *H04L 45/745* (2013.01); *H04L 45/66* (2013.01); *H04L 45/72* (2013.01)

(58) Field of Classification Search
CPC ........ H04L 45/745; H04L 45/66; H04L 45/72
See application file for complete search history.

(56) References Cited

U.S. PATENT DOCUMENTS

| | | | | |
|---|---|---|---|---|
| 2008/0002588 | A1* | 1/2008 | McCaughan | H04L 45/04 370/238 |
| 2010/0284287 | A1* | 11/2010 | Venuto | H04W 40/08 370/252 |
| 2014/0016468 | A1* | 1/2014 | Daraiseh | H04L 45/121 370/235 |
| 2015/0222452 | A1* | 8/2015 | Ng | H04L 12/6418 370/392 |

* cited by examiner

*Primary Examiner* — Duc C Ho
(74) *Attorney, Agent, or Firm* — Barnes & Thornburg LLP

(57) ABSTRACT

Data packets are received at a communication device that is coupled to a network node in a communication network, to a gateway router that is coupled to other network nodes in the communication network, and to a further communication network. For each received data packet, a determination is made as to whether the received data packet is to be routed toward a destination by the communication device instead of by the gateway router. The received data packet is routed toward the destination by the communication device based on determining that the received data packet is to be routed toward the destination by the communication device instead of by the gateway router. Otherwise, the received data packet is switched from the communication device to the gateway router to be routed by the gateway router toward the destination.

25 Claims, 10 Drawing Sheets

METHOD AND SYSTEM FOR SELECTIVE ROUTING OF DATA PACKET TRAFFIC

CROSS-REFERENCE TO RELATED APPLICATION

The present application claims the benefit of U.S. Patent Application Ser. No. 62/288,051, filed on Jan. 28, 2016, the entire contents of which are incorporated herein by reference.

TECHNICAL FIELD

The present invention relates to computer and telecommunications networks, and in particular to selective routing of traffic in such networks.

DESCRIPTION OF RELATED ART

There is often a need for the transfer of large data sets between physically remote Local Area Networks (LANs) over Wide Area Networks (WANs) such as the internet. A LAN could have a gateway router and firewall at its connection point to the WAN. The gateway router and firewall could be implemented as separate devices or the routing and firewall functions could be implemented within a single device. All the data traffic to or from the LAN could pass through the gateway router and firewall. Internal LAN traffic could also pass through the gateway router.

In this situation the transfer of large data sets could tax the performance of a gateway router and firewall and compromise network performance. A large data set could be several petabytes in size. Network performance could become unacceptably slow, the data set transfer could take an unacceptably long time or the gateway router or firewall could stop working altogether.

Similarly, some applications, such as high definition and uncompressed video for example, require very high data bandwidths which may similarly tax a gateway router or firewall. Scaling of a gateway router and firewall to handle occasional and sporadic transfer of large data sets or high bandwidth applications could be costly and inefficient. In addition the gateway router might not be able to provide all of the required operations for managing high speed data transfers, such as detailed flow measurement and control for example.

SUMMARY

According to an aspect of the present disclosure, a method involves: receiving data packets at a communication device that is coupled to a network node in a communication network, to a gateway router that is coupled to other network nodes in the communication network, and to a further communication network; determining for each received data packet whether the received data packet is to be routed toward a destination by the communication device instead of by the gateway router; routing the received data packet toward the destination based on determining that the received data packet is to be routed toward the destination by the communication device instead of by the gateway router; and switching the received data packet from the communication device to the gateway router to be routed by the gateway router toward the destination based on determining that the received data packet is not to be routed toward the destination by the communication device instead of by the gateway router.

An apparatus in accordance with another aspect includes: a network node interface to be coupled to a network node in a communication network; a gateway router interface to be coupled to a gateway router that is coupled to other network nodes in the communication network; a network interface to be coupled to communication equipment in a further communication network; and a selective routing module coupled to the network node interface, to the gateway router interface, and to the network interface, to: receive data packets; to determine for each received data packet whether the received data packet is to be routed toward a destination by the selective routing module instead of by the gateway router; to route the received data packet toward the destination based on determining that the received data packet is to be routed toward the destination by the selective routing module instead of by the gateway router; and to switch the received data packet to the gateway router to be routed by the gateway router toward the destination based on determining that the received data packet is not to be routed toward the destination by the selective routing module instead of by the gateway router.

A further aspect of the present disclosure relates to a non-transitory processor-readable medium storing instructions which, when executed by one or more processors, cause the one or more processors to perform a method that involves: receiving data packets at a communication device that is coupled to a network node in a communication network, to a gateway router that is coupled to other network nodes in the communication network, and to a further communication network; determining for each received data packet whether the received data packet is to be routed toward a destination by the communication device instead of by the gateway router; routing the received data packet toward the destination based on determining that the received data packet is to be routed toward the destination by the communication device instead of by the gateway router; and switching the received data packet from the communication device to the gateway router to be routed by the gateway router toward the destination based on determining that the received data packet is not to be routed toward the destination by the communication device instead of by the gateway router.

Other aspects and features of embodiments of the present disclosure will become apparent to those ordinarily skilled in the art upon review of the following description.

BRIEF DESCRIPTION OF THE DRAWINGS

Examples of embodiments of the invention will now be described in greater detail with reference to the accompanying drawings.

DETAILED DESCRIPTION

Communication traffic can take any of various forms and include any of various types of information. Data flows and data packets as referenced herein are examples of communication traffic to which the embodiments disclosed herein could be applied. The present disclosure is not necessarily limited to transfer of data, or to data or information that is specifically formatted into packets. Features that are disclosed herein with reference to data flows or data traffic could be applied to communication traffic other than data flows, to communication traffic that is formatted into blocks other than packets, and/or to communication traffic that includes content or payloads other than strictly data.

A data flow is a unidirectional flow of data packets with a set of common characteristics. A set of common characteristics could be, for example, the packet's Internet Protocol (IP) source and destination addresses, its IP protocol, its source and destination ports and its IP class of service. Data flows could be characterized as to their start time, end time, and number of bytes or packets in the flow, for example.

A data packet is organized according to well-known protocols such as, for example the Transmission Control Protocol (TCP). A data packet is typically organized into a header and a payload. The header contains information about the packet such as its source and destination addresses. The payload is the actual data to be transferred.

Figure 1A:
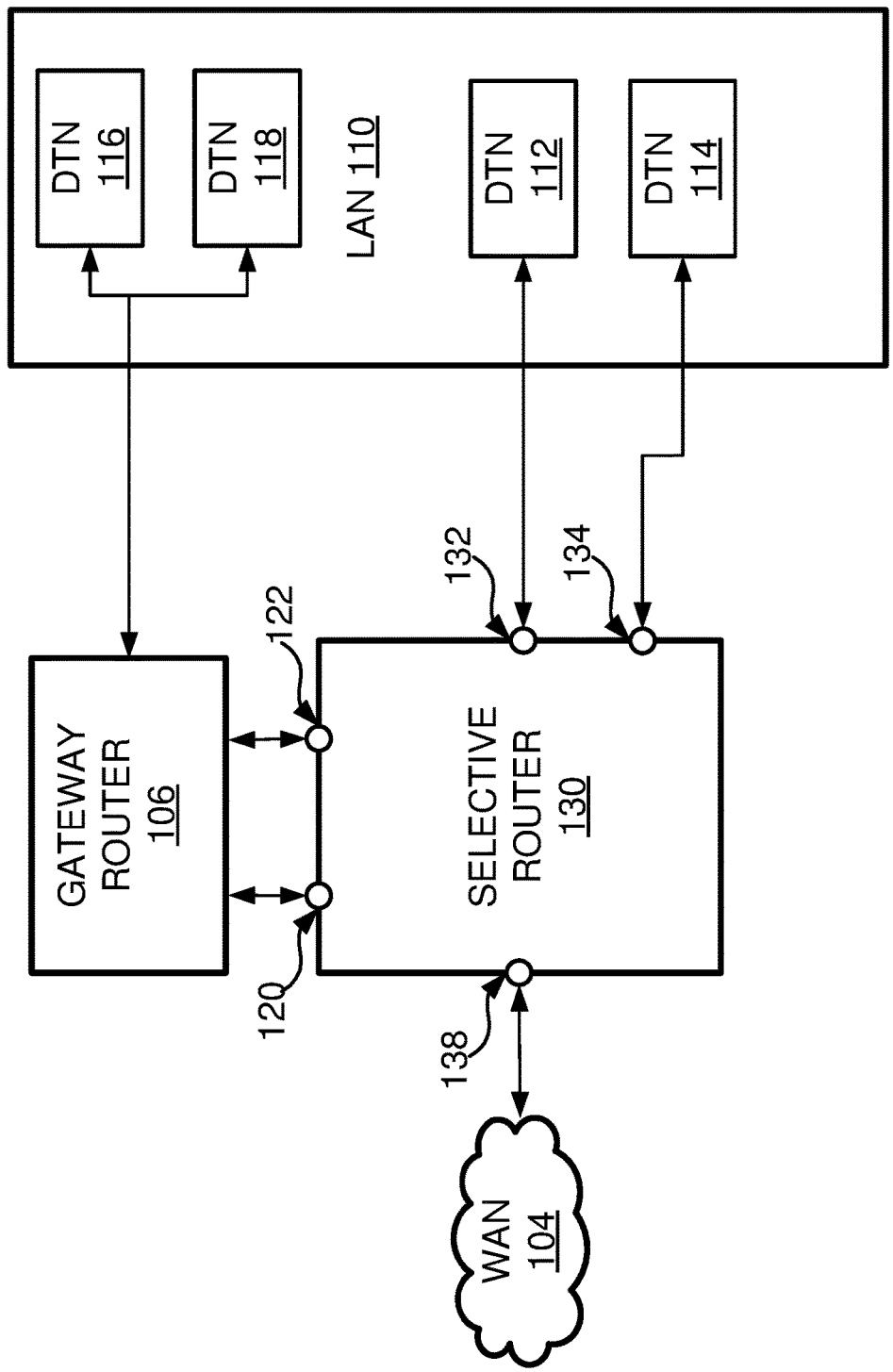
FIG. 1A is a block diagram of an example network architecture.

FIG. 1A is a block diagram of an example network architecture. The example shown in FIG. 1A includes a WAN 104, a gateway router 106, a LAN 110, and a selective router 130 for handling data flows in an embodiment.

LAN 110 could be a university campus, a research facility or an industrial laboratory, for example. LAN 110 could be a specialized sub-network for large data transfers such as, for example, a Science DMZ sub-network. LAN 110 comprises a plurality of Data Transfer Nodes (DTNs) 112, 114, 116, 118. A DTN could be, for example, a single computer, a server or a storage node cluster.

DTNs 112, 114 within LAN 110 are Preferred Data Transfer Nodes. Preferred DTNs could be the sources or destinations for large data set transfers or high bandwidth data transfers with a source or destination in a remote LAN, for example. A Preferred DTN could run specialized data transfer software such as, for example, GridFTP.

Selective router 130 comprises gateway WAN port 120, gateway LAN port 122, WAN port 138 and preferred DTN ports 132, 134. These ports of the selective router 130 represent at least logical interfaces to the interconnections, and the exact physical form of each port is implementation-specific. For example, the ports could be implemented over a single physical port/link, as separate VLANs or they could be implemented as two different physical interfaces. The interconnections between these ports of the selective router 130 and the other elements in FIG. 1A are also implementation-specific, and could include network cables in an embodiment.

DTNs 116 and 118 connect to gateway router 106. Preferred DTNs 112 and 114 connect to selective router 130 at selected LAN ports 132 and 134 respectively.

Gateway router 106 connects to selective router 130 at gateway LAN port 122 and gateway WAN port 120. Gateway router 106 could incorporate firewall as well as routing functions. Gateway LAN port 122 carries data traffic between the DTNs and the Preferred DTNs of LAN 110. For example, gateway LAN port 122 could carry data traffic between DTNs 116 or 118 and DTNs 112 or 114. Gateway WAN port 120 carries traffic between LAN 110 and WAN 104 through gateway router 106.

Selective router 130 connects to WAN 104 through WAN connection 138.

A router routes a data packet by reading the packet's destination IP address and then looking up that address in its routing table. A routing table is a table of destination IP addresses and the corresponding MAC (Media Access Controller) addresses of the next router to which the packet is to be sent (the "next hop"). In a routing operation a router rewrites the data packet's destination header with a new MAC address corresponding to the next hop IP address. The packet is then be sent to the appropriate router egress port. An egress port is a router port at which a data packet is output.

Selective router 130 might not necessarily route data packets. It could instead switch the data packets between an ingress port and an egress port without rewriting the data packets' destination headers. An ingress port is the selective router's port at which a packet enters the selective router. An egress port is the selective router's port at which a packet leaves the router.

When selective router 130 switches a data packet it could read the packet's destination MAC address. It could then consult its switching table to find the correct egress port for the packet. A switching table is a table of MAC addresses and their corresponding egress ports.

Selective router 130 could appear to gateway router 106 as a link layer switch providing connectivity to other routers (not shown) in WAN 104 and selected DTNs in LAN 110, such as Preferred DTNs 112 and 114. Selective router 130 could switch incoming traffic from WAN 104 or Preferred DTNs 112, 114 to gateway router 106. For example, selective router 130 could switch all incoming data traffic from WAN 104 to gateway router 106 through gateway WAN port 120 and switch all incoming data from Preferred DTNs 112, 114 to gateway router 106 through gateway LAN connection 122. This could provide full routed connectivity between Preferred DTNs 112, 114, DTNs 116, 118 and WAN 104 via gateway router 106.

Selective router 130 could also or instead switch traffic between preferred DTNs, such as between DTN 112 and DTN 114, for example.

Figure 1B:
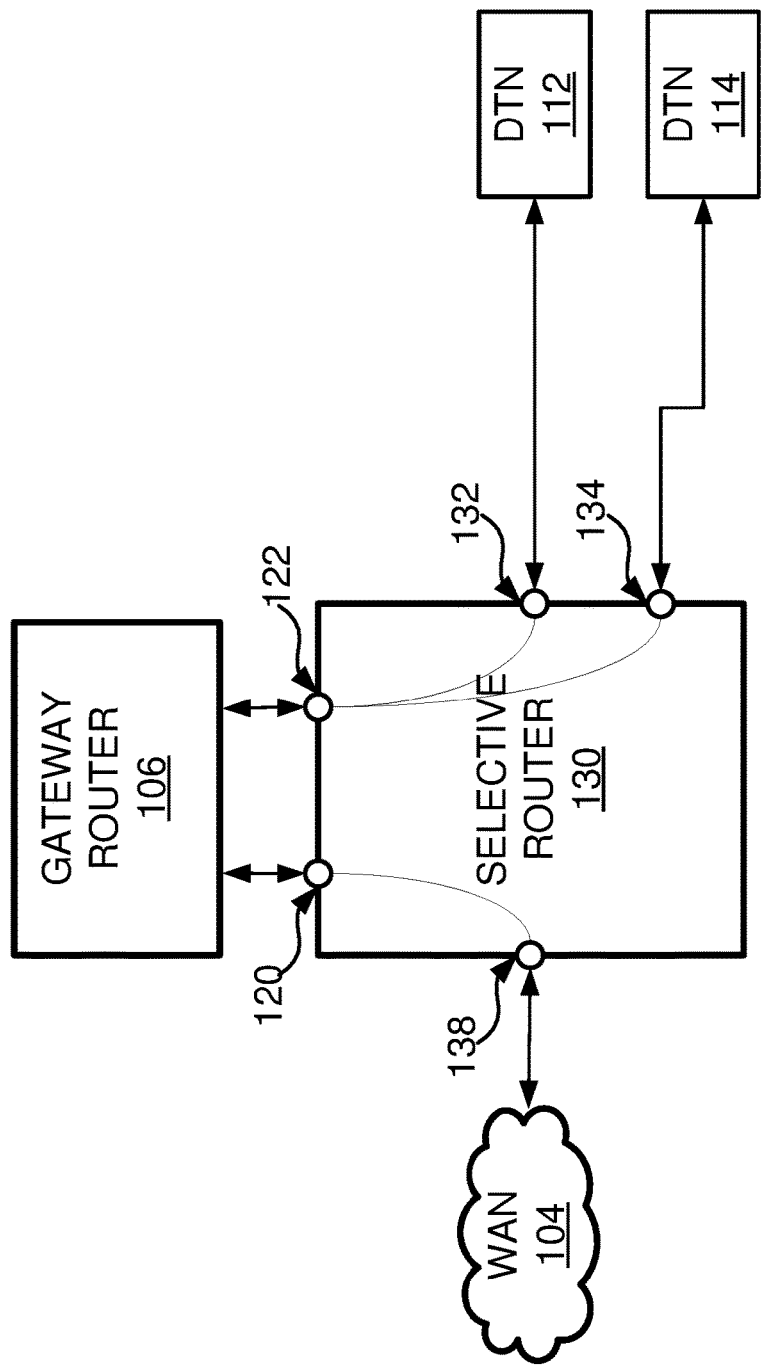
FIG. 1B is a block diagram illustrating how a selective a router could provide data switching functionality in the network of FIG. 1A.

FIG. 1B is a network diagram illustrating how a selective a router could provide data switching functionality, in the network of FIG. 1A. Selective router 130 provides point to point connection between WAN 104 and gateway router 106 creating a virtual LAN between WAN port 138 and gateway WAN port 120. It also creates a virtual LAN and provides multipoint to multipoint connectivity between preferred DTN ports 132, 134 and gateway LAN port 122. The connectivity is multipoint in the sense that any preferred DTN can connect to any other preferred DTN through gateway router 106 and selective router 130. When a data packet from WAN 104 and destined for one of preferred DTNs 112, 114 arrives at WAN port 138 it is switched by selective router 130 to gateway router 106 through gateway WAN port 120. Gateway router 106 then routes the packet to Gateway LAN port 122. Selective router 130 then switches the packet to its destination through one of preferred DTN ports 132, 134.

FIG. 1B illustrates switching only functionality that could be provided by selective router 130. In an embodiment, selective router 130 also routes selected data packets travelling between WAN 104 and Preferred DTNs 112, 114. These packets could be routed between Preferred DTNs 112, 114 and WAN 104 without passing through or being routed by gateway router 106. The selected data packets could be those which comprise large data set transfers or high bandwidth flows. Routing these types of packets using selective router 130 could significantly unburden gateway router 106.

Only selected packets could be routed in this way by selective router 130. Non-selected packets travelling between WAN 104 and Preferred DTNs 112, 114 could be switched to and routed by gateway router 106 which would provide routing functionality for those packets. This could simplify the design of selective router 130 as it would not need to be capable of routing all data packets.

For example, non-selected data packets from Preferred DTNs 112, 114 destined for WAN 104 could be switched to gateway router 106 through LAN port 122 and then routed by gateway router 106 through gateway WAN port 120.

Data packets could be chosen for selective routing by selective router 130 using any of a variety of methods. For example, a data packet could be chosen based on its destination IP address. In an embodiment, all packets or data flows from WAN 104 destined for Preferred DTNs 112, 114 could be chosen for selective routing by selective router 130.

Other methods are also possible. For example, a data packet could be chosen for selective routing based on a specific combination of data packet characteristics such as, for example, its destination IP address, its source IP address, its IP protocol type, its IP destination port, its IP source port or its IP class of service. IP protocol types could be, for example, TCP (Transmission Control Protocol) or UDP (User Datagram Protocol). IP source or destination ports could be, for example, an FTP (File Transfer Protocol) port or a Real-time Transfer Protocol (RTP) port. Classes of service could include: Expedited Forwarding, Assured Forwarding or Best Effort.

There could be any of a plurality of combinations of packet characteristics. In some embodiments there could be several thousand different combinations of packet characteristics.

The combinations of packet characteristics could be stored in the selective router's routing table, for example. The routing table could have one entry for each different combination. Each entry could comprise a different combination of data packet characteristics and the corresponding MAC address of the next hop for a data packet which satisfies that particular combination of characteristics.

Figure 2:
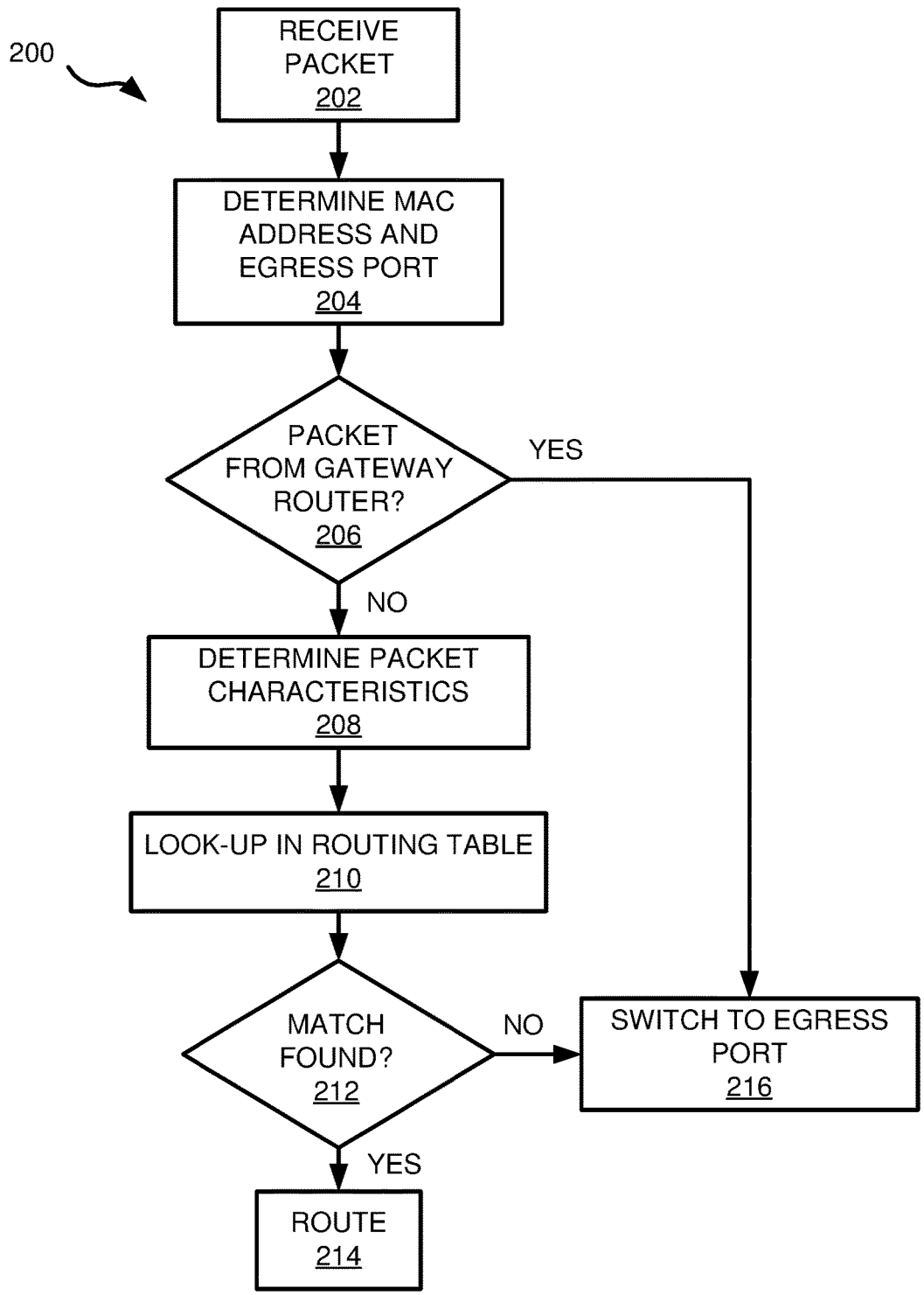
FIG. 2 is a flowchart of an example selective routing method.

FIG. 2 is a flowchart of an example selective routing method. Method 200 could be used by a selective router to transmit data packets between a WAN and a LAN.

At 202 a packet is received by the selective router. At 204 the MAC address of the packet and the corresponding egress port are determined from the selective router's switching table. At 206 it is determined if the packet originated from the gateway router (gateway router 106 of FIG. 1A for example). This could be determined by, for example, determining the ingress port of the data packet. The ingress port is the selective router's port at which the packet entered (gateway WAN port 120 or gateway LAN port 122 of FIG. 1A for example).

If the packet is from the gateway router (YES at 206) then the packet has already been routed by the gateway router and is switched to the egress port (as determined at 204) at 216. If the packet is not from the gateway router (NO at 206) the packet's characteristics are determined by the selective router at 208. If the packet is not from the gateway router then it must be from a Preferred DTN or from the WAN, for example, one of Preferred DTNs 112, 114 or WAN 104.

At 210 the packet's characteristics are looked up in the selective router's routing table. If a match is found between the packet's characteristics and a routing table entry (YES at 212) then the packet is routed by the selective router at 214 using the next hop address from the routing table. The router rewrites the data packet's destination header with a new MAC address corresponding to the next hop IP address. The router could in addition, rewrite the data packet's MAC source address to that of the gateway router. This could make it appear as if a selectively routed packet had traversed the gateway router. This could be beneficial if certain security checks are in place in either the preferred DTNs or routers in the WAN, for example.

The selective router could, in addition also decrement the packet's Time To Live (TTL) counter. A packet's TTL counter is set by the sender and is normally decremented every time the packet is routed. A packet might be dropped once its TTL counter reaches zero.

Alternatively, the selective router could not decrement the TTL count. In this case the TTL count of received packets in a data flow would differ depending on whether the packet was selectively routed or routed by the gateway router. This could be beneficial, for example, in allowing other systems to determine when a selective routing of a dataflow had commenced, based on differences in TTL counts, or more generally a routing count value, between different packets in the same data flow.

If a match is not found (NO at 212) then the packet is switched to the egress port (as determined at 204) at 216.

In some embodiments, the MAC address and egress port could be determined after a decision regarding selective routing has been made. For example, the operation at 204 could instead be performed in response to a YES decision at 206 or a NO decision at 212, and before switching at 216.

A selective router could be implemented using Software Defined Networking (SDN). In software defined networking the data path and the control path of a router are separated. An SDN data path provides the ability to route selected data flows without requiring the SDN switch or associated controller to implement a complete suite of routing protocols. A complete routing function could be provided by an attached gateway router, which could have significantly less capacity than the SDN data path. The SDN data path could handle large data set transfers or high bandwidth data flows as disclosed herein.

The selective router's routing table could be constructed in any of a variety of ways. For example, the selective router's routing table could contain the list of all IP destination addresses that are to be routed by the selective router. Any data packet with a destination IP address found in the routing table could be selectively routed. These IP addresses could correspond to origins or destinations of large data transfers or high bandwidth transfers, for example Preferred DTNs 112, 114.

Other data packet selection methods are possible. For example, the routing table could contain additional fields such as the data packet's source IP address, its IP protocol type, its IP destination port, its IP source port or its class of service. Only data packets with characteristics matching a routing table entry could be selectively routed. The selective router's routing table could be populated by any of various methods, examples of which are described below.

For example, source or destination IP addresses or address prefixes of all selected LAN DTNs or WAN DTNS could be provisioned manually by a system administrator based on administrative knowledge.

Routing entries could also or instead be automatically discovered based on traffic characteristics, such as IP addresses discovered from packets sent from the LAN's preferred DTN (for example Preferred DTN 112, 114 of FIG. 1A).

Figure 3:
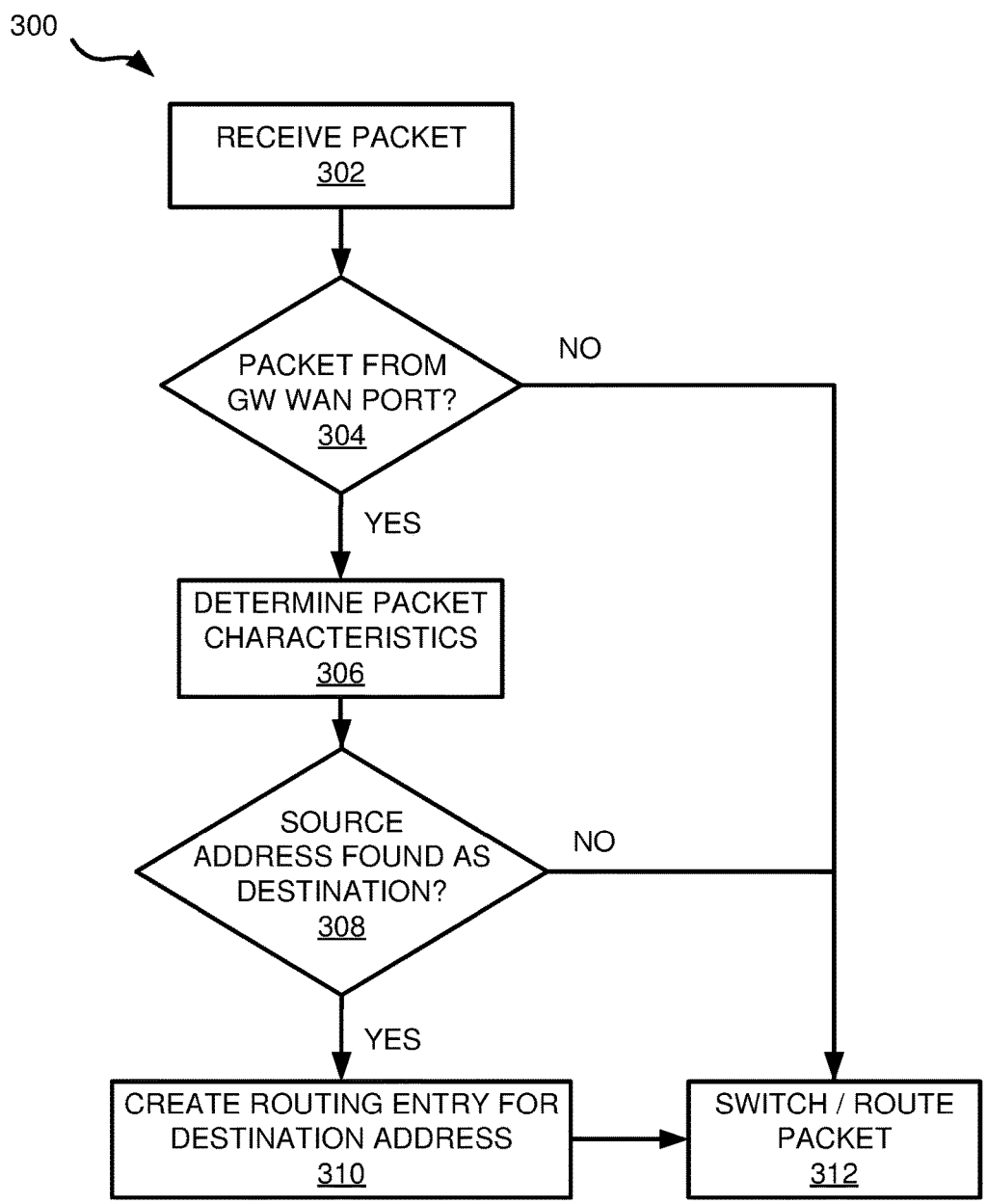
FIG. 3 is a flowchart illustrating an example selective routing method according to another embodiment.

FIG. 3 is a flowchart of an example selective routing method 300 according to another embodiment, and includes discovery-based routing table population. A packet is received by the selective router at 302. If the packet was received at the selective router's gateway WAN port, for example, gateway WAN port 120 of FIG. 1A (YES at 304), then the packet's characteristics including at least its source IP address are determined at 306. If the packet was not received at the gateway WAN port (NO at 304) then at 312 it is switched or routed as described above. If the IP source address is found to also be an IP destination address in an entry in the selective router's routing table (YES at 308) then a new routing table entry is created at 310. In an embodiment, any existing routing table entry including this information is overwritten with the new routing table entry. In other embodiments the new routing table entry is created only if a routing table entry including this information does not already exist. The packet is switched toward its destination at 312. The new entry could use at least the packet's IP destination address in its destination field, and possibly additional other characteristics of the packet. Once this entry is in place, subsequent data packets with at least that destination IP address received at a selective router's preferred DTN ports could be routed by the selective router rather than switched to the gateway router. If the IP source address is not found to also be an IP destination address (NO at 308) then at 312 it is switched as described above.

Consider an example in which the packet received at 302 has a source address "DTN1" of a preferred DTN and a destination address "WAN1" in the WAN. If DTN1 is found as a destination address in the routing table at 308, then DTN1 is already known to be a destination of a large data flow. It could then be presumed that that DTN1 is also a source of large data flows, and that WAN1 is a large data flow destination. WAN1 is then also added as an entry in the routing table, to configure bidirectional selective routing between addresses WAN1 and DTN1. This situation could arise, for example, when a Preferred DTN sends a data packet that is destined for a WAN destination that is not in the selective router's routing table. Such a data packet could be switched to the gateway router LAN port for routing, and then routed back to the selective router's gateway WAN port 120 and received at 308.

Figure 4:
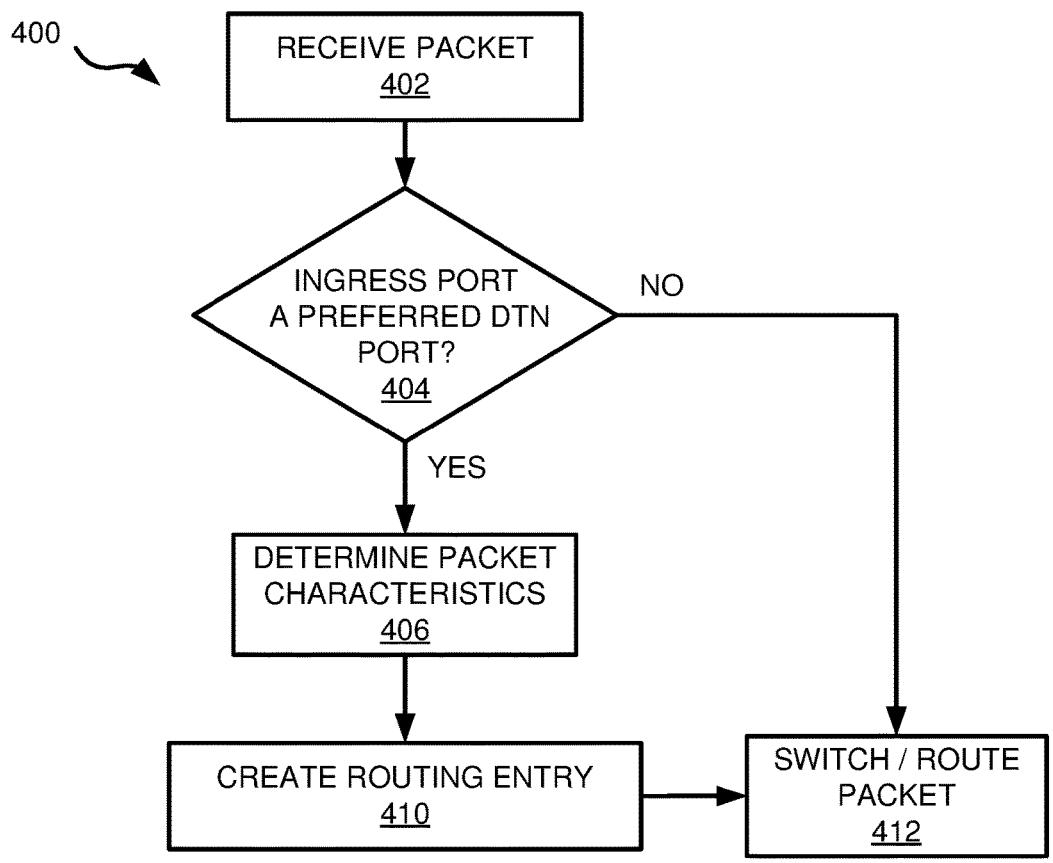
FIG. 4 is a flowchart illustrating a further example selective routing method.

FIG. 4 is a flowchart of another example selective routing method, and includes discovery-based routing table population according to another embodiment. In this method 400, routing table entries for preferred DTN destinations are discovered from the source address of packets received on the selective router's preferred DTN ports.

A packet is received by the selective router at 402. If the packet's ingress port is a Preferred DTN port, for example preferred DTN ports 132, 134 of FIG. 1A, (YES at 404) then the packet's characteristics including at least its IP source address are determined at 406 and a new routing table entry is created at 410 and the packet's IP source address is entered in the IP destination field of the entry, and possibly additional other characteristics of the packet. In an embodiment, any existing routing table entry including this information is overwritten with the new routing table entry. In other embodiments the new routing table entry is created only if a routing table entry including this information does not already exist.

If the packet's ingress port is not a Preferred DTN port (NO at 404), or after creation of the new routing entry or entries at 410, then at 412 the packet is switched or routed as described above.

The new routing table entry could use at least the packet's source address in addition to other characteristics of the packet. Subsequent packets received by the selective router at its WAN port, for example WAN port 138, will be routed to its the Preferred DTN ports, for example preferred DTN ports 132, 134 of FIG. 1A rather than switched to a gateway router.

Routing table entries for destinations in a WAN could also or instead be created based on information received from file transfer software used to control the transfer of large data sets or high bandwidth flows. Examples of such software are GLOBUS (www.globus.org) or Fast Data Transfer (http://monalisa.cern.ch/FDT/.) For example, at least the endpoint of a GLOBUS controlled data transfer could be automatically entered in the selective router's routing table as a destination IP address.

Figure 5:
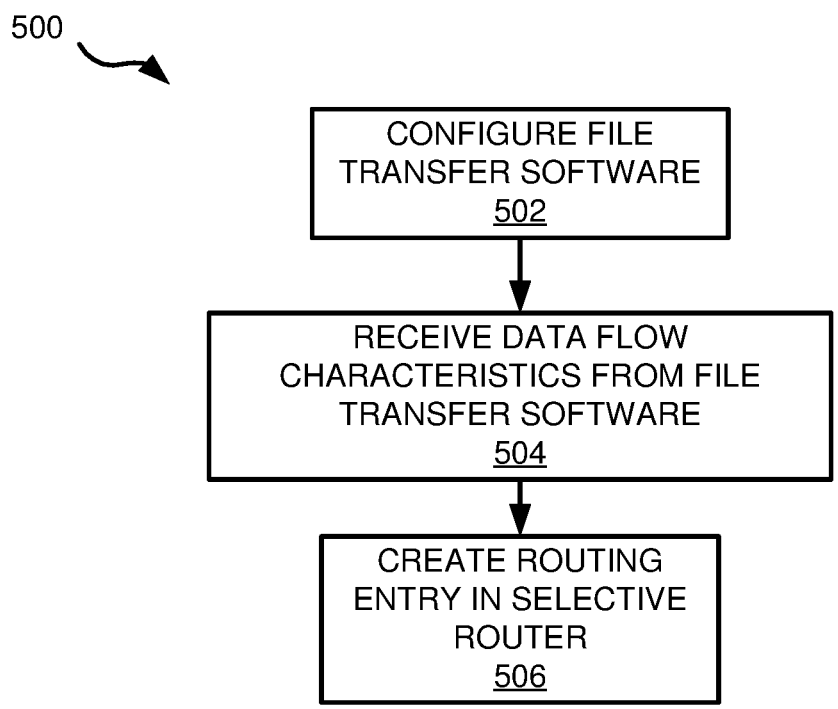
FIG. 5 is a flowchart illustrating an example routing table management method.

FIG. 5 is a flowchart of an example routing table management method 500, relating to routing table population. At 502 file transfer software for a large data set transfer is configured. Configuration data of the data flow could include the packet's Internet Protocol (IP) source and destination addresses, its IP protocol, its source and destination ports and its IP class of service, for example. The data flow could be characterized as to its start time, maximum duration, expected end time, and number of bytes or packets in the flow, for example.

At 504 characteristics of the dataflow are received by the selective router. The dataflow characteristics could be sent to the selective router by the file transfer software just prior to the start of the data transfer. At 506 a routing table entry based on the received dataflow characteristics is created in the selective router's routing table based on the received dataflow characteristics. There could be a plurality of data flows related to a file transfer. For example there could be flows in both directions and/or multiple parallel flows.

Routing table entries could also be automatically removed based on information received from file transfer software. For example, after the file transfer software has completed the data set transfer it could notify the selective router to remove the routing table entry. This could keep the number of entries in the routing table to a manageable number, and could also improve system security. It could prevent malicious individuals from later accessing the preferred DTNs using the data flow's routing table entry, for example.

Figure 6:
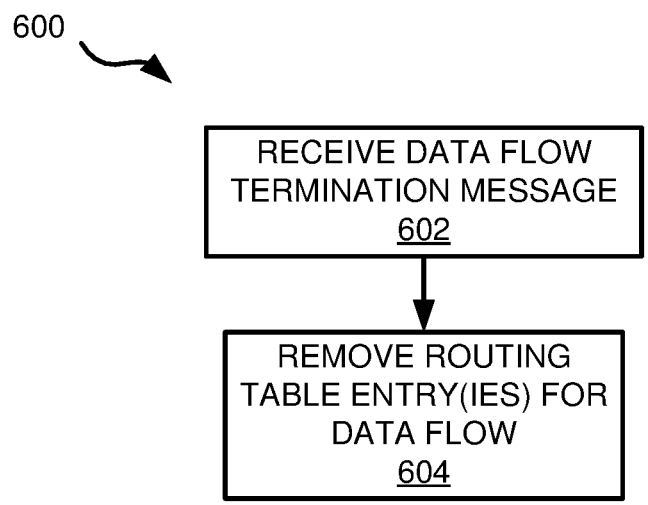
FIG. 6 is a flowchart illustrating an example routing table management method according to another embodiment.

FIG. 6 is a flowchart of another example routing table management method 600, relating to routing table entry removal. At 602 the selective router receives a message that a dataflow has been terminated from file transfer software running on a remote server. At 604 the selective router removes the routing table entry(ies) corresponding to that dataflow.

The example methods in FIGS. 3 to 6 are intended for illustrative purposes. Other embodiments could involve performing the illustrated operations in any of various ways, performing fewer or additional operations, and/or varying the order in which operations are performed. Other variations could be or become apparent to a skilled person based on the present disclosure.

In general terms, the flowcharts in FIGS. 3 and 4 illustrate selective routing methods that involve receiving data packets at a communication device that is coupled to a network node in a communication network, to a gateway router that is coupled to other network nodes in the communication network, and to a further communication network. FIG. 1A illustrates an embodiment in which the selective router 130 is an example of such a communication device, the Preferred DTNs 112, 114 and the LAN 110 are examples of a network node in a communication network, and the WAN is an example of a further communication network. FIG. 1A also shows a gateway router at 106.

For each received data packet, a determination is made as to whether the received data packet is to be routed toward a destination by the communication device instead of by the gateway router. The received data packet is routed toward the destination by the communication device based on determining that the received data packet is to be routed toward the destination by the communication device instead of by the gateway router. Otherwise, the received data packet is switched from the communication device to the gateway router to be routed by the gateway router toward the destination, based on determining that the received data packet is not to be routed toward the destination by the communication device instead of by the gateway router.

A method could involve determining for each received data packet whether the received data packet is received from the gateway router, as shown at 304 in FIG. 3. A determination could be made that the received data packet is not to be routed toward the destination by the communication device instead of by the gateway router based on determining that the received data packet is received from the gateway router.

In some embodiments, a method could involve determining one or more characteristics of the received data packet, such as shown at 306 in FIG. 3, and determining whether the one or more characteristics of the received data packet satisfy a selective routing condition. A determination could then be made that the received data packet is to be routed toward the destination by the communication device instead of by the gateway router based on determining that the one or more characteristics of the received data packet satisfy the selective routing condition. The source address determination at 308 in FIG. 3 is an example of a selective routing condition, that the one or more characteristics of the received data packet match an entry in a routing table at the communication device.

FIG. 3 also illustrates discovery-based population of a routing table that is consulted in selective routing of data packets. If a data packet is received from the gateway router, as determined at 304 for example, then a determination is made at 308 as to whether a source address in the received data packet received from the gateway router matches a destination address in the routing table. If so, then the routing table is populated with a new entry that includes at least the destination address of the received data packet.

A method could also involve determining whether the received data packet is received from the network node, by determining whether the data packet was received on a preferred DTN port as shown at 404 in FIG. 4, for example. A determination could then be made as to whether a source address in the received data packet received from the network node matches a destination address in a routing table, and if not the routing table could be populated with a new entry. The source address could be determined at 406 in FIG. 4, which also shows populating the routing table by creating a routing entry at 410.

In another embodiment of a selective routing method, one or more characteristics of a data flow that has been configured for transfer to or from the network node could be received, as shown at 504 in FIG. 5. A routing table could be populated with a new entry based on the received one or more characteristics, as shown by way of example as creation of a new routing entry at 506. The one or more characteristics could include a destination IP address, and the new entry could include the destination IP address.

A data flow termination message as referenced at 602 in FIG. 6 is an example of an indication that a data flow for which a routing table includes one or more entries has ended. Based on receiving such an indication, the one or more entries could be removed from the routing table as shown at 604.

In some embodiments, the routing by the communication device includes rewriting source address information in the received data packet with new source address information associated with the gateway router. The routing by the communication device could also or instead include maintaining a current count value, in the received data packet, that indicates a number of times the received data packet is routed. TTL count is an example of such a count value.

Switching of a received data packet could involve, for example, determining a MAC address of the received data packet, determining an egress port corresponding to the MAC address, and switching the received data packet to the determined egress port.

Figure 7:
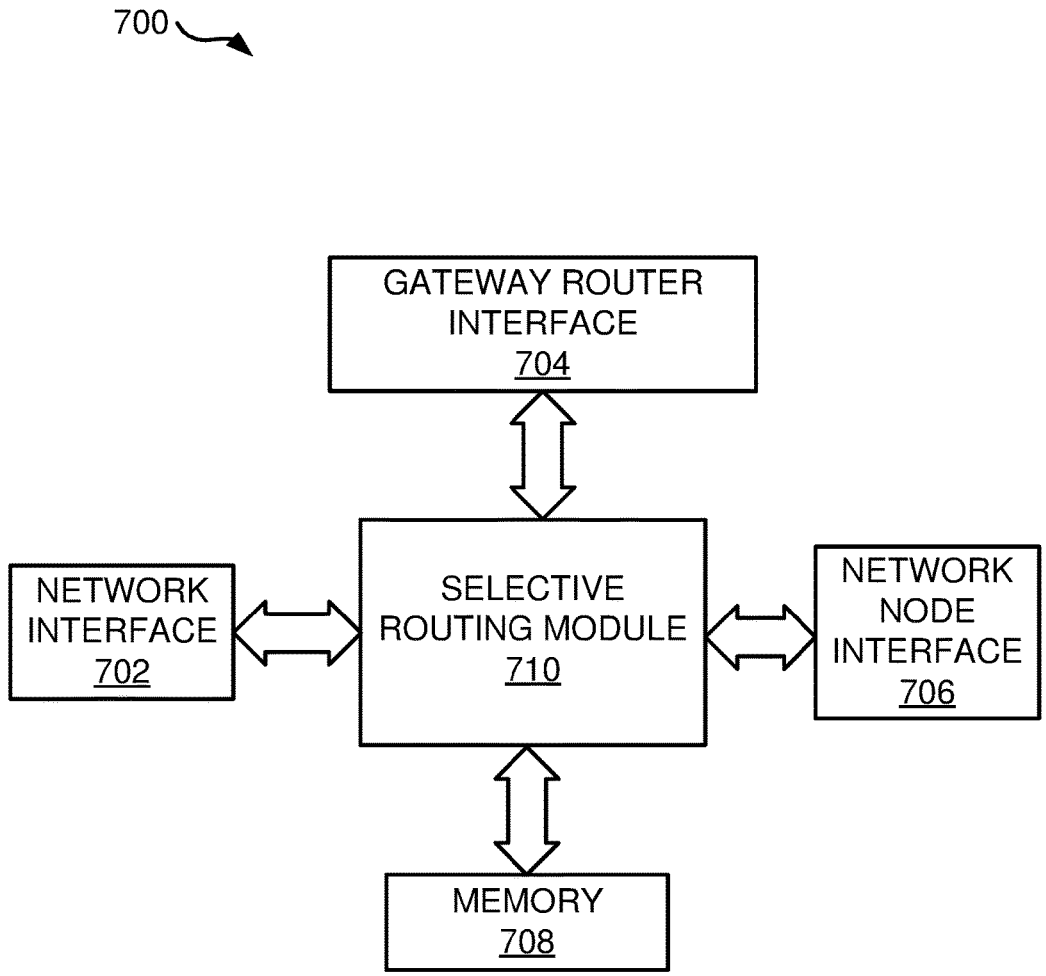
FIG. 7 is a block diagram of an apparatus according to a further embodiment.

FIG. 7 is a block diagram of an apparatus according to a further embodiment. The apparatus 700 includes one or more network interfaces 702, one or more gateway interfaces 704, one or more network node interfaces 706, and a memory 708, coupled to a selective routing module 710.

The network node interface(s) 706 are to be coupled to one or more network nodes in a communication network. The ports 132, 134 and Preferred DTNs 112, 114 (FIG. 1A) are examples of such network node interfaces and network nodes.

The gateway router interface(s) 704 are to be coupled to a gateway router that is coupled to other network nodes in the communication network. The ports 120, 122 and DTNs 116, 118 (FIG. 1A) are examples of such gateway router interfaces and network nodes.

The WAN port 138 (FIG. 1A) is an example of a network interface 702 to be coupled to communication equipment in a further communication network, such as the WAN 104.

The memory 708 is used to store at least a routing table in some embodiments. The memory 708 could implement a non-transitory processor-readable medium in one or more solid-state memory devices and/or memory devices with movable and possibly removable storage media.

The selective routing module 710 could be implemented in circuitry, such as a processor, that is configured to implement selective routing as disclosed herein. In general, hardware, firmware, components which execute software, or some combination thereof might be used in implementing the selective routing module 710. Electronic devices that might be suitable for implementing the selective routing module 710 include, among others, microprocessors, microcontrollers, Programmable Logic Devices (PLDs), Field Programmable Gate Arrays (FPGAs), Application Specific Integrated Circuits (ASICs), and other types of "intelligent" integrated circuits. In a processor-based implementation, processor-executable instructions to configure a processor to perform operations are stored in a non-transitory processor-readable medium, such as the memory 708.

In operation, selective routing module 710 is configured to receive data packets through an interface 702, 706, to determine for each received data packet whether the received data packet is to be routed toward a destination by the selective routing module instead of by the gateway router, and to route the received data packet toward the destination, via a network interface 702 or a network node interface 706, based on determining that the received data packet is to be routed toward the destination by the selective routing module instead of by the gateway router. The selective routing module 710 is configured to otherwise switch the received data packet to the gateway router via a gateway router interface 704 to be routed by the gateway router toward the destination based on determining that the received data packet is not to be routed toward the destination by the selective routing module instead of by the gateway router.

The selective routing module 710 could be configured to determine, for each received data packet, whether the received data packet is received from the gateway router, and to determine that the received data packet is not to be routed toward the destination by the selective routing module instead of by the gateway router based on determining that the received data packet is received from the gateway router.

In some embodiments, the selective routing module 710 is configured to, for each received data packet, determine one or more characteristics of the received data packet, determine whether the one or more characteristics of the received data packet satisfy a selective routing condition, and determine that the received data packet is to be routed toward the destination by the selective routing module instead of by the gateway router based on determining that the one or more characteristics of the received data packet satisfy the selective routing condition. The selective routing condition could be that the one or more characteristics of the received communication traffic matching an entry in a routing table that is stored in the memory 708, for example.

In an embodiment in which the selective routing module 710 is configured to consult a routing table in the memory 708 to route a received data packet, the selective routing module could be further configured to determine for each received data packet whether the received data packet is received from the gateway router; to determine whether a source address in the received data packet received from the gateway router matches a destination address in the routing table; and to populate the routing table with a new entry comprising at least the destination address of the received data packet based on determining that the source address in the received data packet received from the gateway router matches a destination address in the routing table.

The selective routing module 710 could also or instead be configured to determine for each received data packet whether the received data packet is received from the network node; to determine whether a source address in the received data packet received from the network node matches a destination address in the routing table; and to populate the routing table with a new entry based on determining that the source address in the received data packet does not match a destination address in the routing table.

The selective routing module 710 could be configured to operate in conjunction with file transfer software. For example, the selective routing module 710 could be configured to receive, through an interface 702, 704, or 706 or a separate control interface, one or more characteristics of a data flow configured for transfer to or from the network node coupled to the network node interface, and to populate a routing table with a new entry based on the received one or more characteristics. As noted above, the one or more characteristics could include a destination IP address, and the new entry could include the destination IP address.

In some embodiments, the selective routing module 710 is configured to receive an indication that a data flow for which the routing table includes one or more entries has ended, and to remove the one or more entries from the routing table.

Other features could also or instead be provided by the selective routing module 710. For example, in some embodiments the selective routing module 710 is configured to rewrite source address information in a received data packet that is to be routed by the selective routing module with new source address information associated with the gateway router. The selective routing module 710 could also or instead be configured to maintain a current count value such as a TTL count, in a received data packet that is to be routed by the selective routing module, that indicates a number of times the received data packet is routed.

The selective routing module 710 could route a received data packet toward a destination, or switch a received data packet to the gateway router via a gateway router interface 704 to be routed by the gateway router. For switching a data packet to the gateway router interface, the selective routing module 710 could be configured to determine a MAC address of a received data packet that is to be switched to the gateway router, to determine an egress port corresponding to the MAC address, and to switch the received data packet to the determined egress port.

Figure 8A:
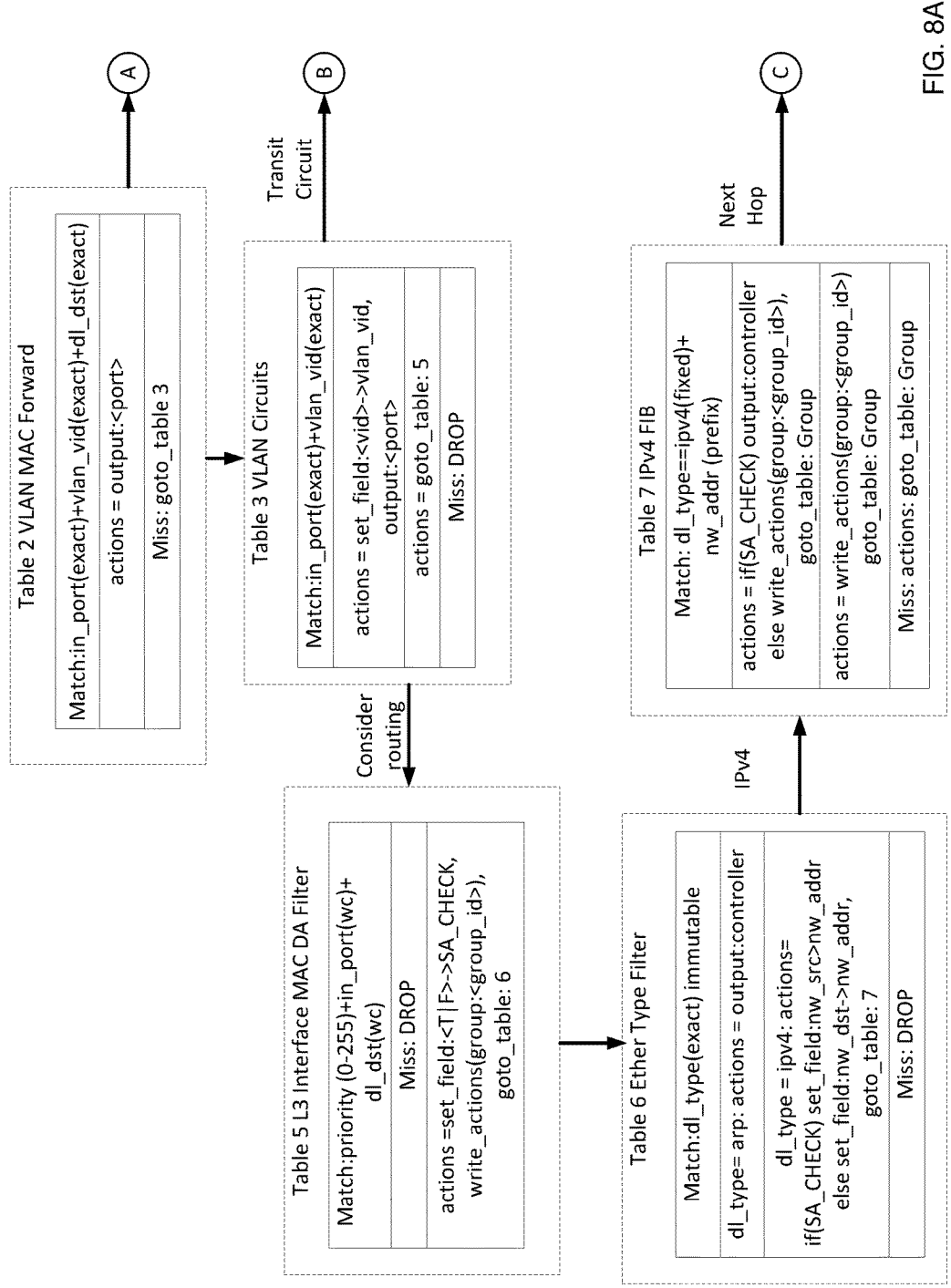
FIGS. 8A and 8B form a block diagram illustrating pipeline details as a detailed example for implementing a selective router of an embodiment.
Figure 8B:
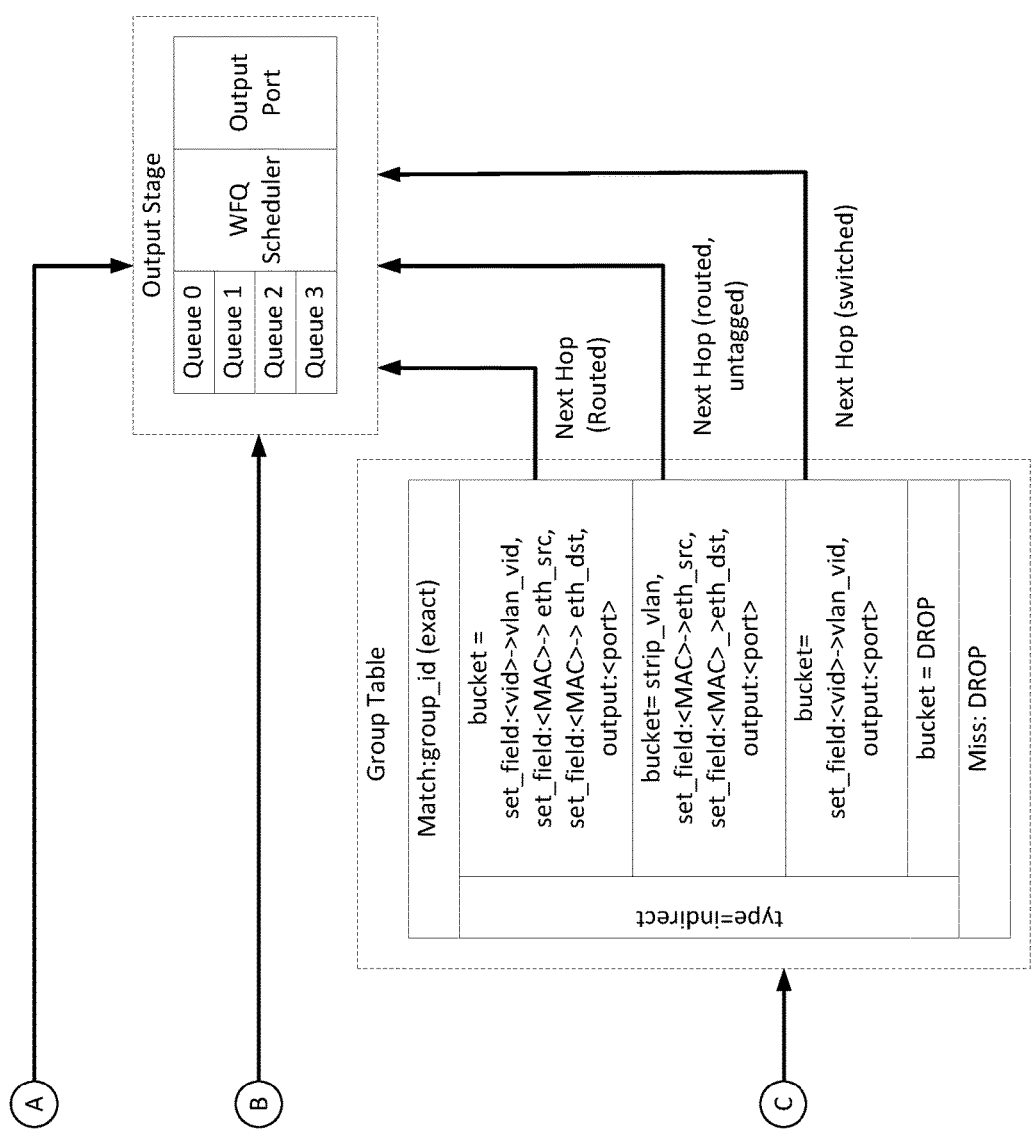

Method and apparatus embodiments are described by way of example above. FIGS. 8A and 8B provide a more detailed example of an embodiment.

In this example, the WAN port of a selective router is called an "I2 port" (Internet 2 port), a gateway router is referred to as "GW", and the Preferred DTN ports of a selective router are referred to as a "DTN" port. This example is designed to integrate well with an existing data path pipeline design. Other designs to accomplish selective routing are possible, using different table patterns.

The following seven traffic cases are considered:
1. I2->DTN
   [tc1] Since all Preferred DTN IP addresses are known, this traffic is routed directly to a DTN port, appearing as if it had been routed by the gateway router
2. I2->GW (i.e., to a non-Preferred DTN destination)
   [tc2] Since non-Preferred DTN IP addresses are not known to a selective router and a WAN VLAN connects the I2 port to a GW port in this example, this traffic is VLAN Circuit forwarded (after miss on IP DA match)
3. GW->DTN (i.e., from a non-Preferred DTN source)
   [tc3] Since non-Preferred DTN IP addresses are not known and the LAN VLAN connects the GW port to all DTN ports in this example, this traffic is MAC address forwarded
4. GW->I2 (i.e., from a non-Preferred DTN source)
   [tc4] Since non-Preferred DTN IP addresses are not known and the WAN VLAN connects the I2 port to a GW port, this traffic is VLAN Circuit forwarded (after miss on IP SA match—see [tc5bii])
5. DTN->I2
   a. [tc5a] For a known WAN IP address this traffic is routed
   b. For an unknown WAN IP address
      i. [tc5bi] Traffic from a DTN port is VLAN Circuit forwarded to GW port (same as [tc6] but the packet will return on the GW WAN VLAN)
      ii. [tc5bii] Traffic from GW WAN VLAN is sent to routing table but IP SA is matched, packet is sent to Controller, Controller creates a routing entry for the IP destination address ("learning" WAN IP address) and sends the packet on to I2

6. DTN->GW (i.e., to a non-Preferred DTN destination) [tc6] Since non-Preferred DTN IP addresses are not known and the LAN VLAN connects the DTN port to the GW port, this traffic is MAC address forwarded (after miss on IP DA match)

7. DTN->DTN
[tc7] Since all DTN ports are on the LAN VLAN, this traffic is MAC address forwarded Traffic can arrive at the selective router in four ways:
I2 WAN VLAN (Traffic cases [tc1] and [tc2])
GW WAN VLAN (Traffic cases [tc4] and [tc5bii])
GW DMZ VLAN (Traffic case [tc3])
DTN DMZ VLAN (Traffic cases [tc5a], [tc5bi], [tc6], and [tc7])

Referring now to FIGS. 8A and 8B:

Configured Values for the Pipeline Description:
  I2_port: the port connected to (or toward) Internet2
  I2_WAN_VID: the VID for AL3S traffic on the I2_port (WAN VLAN)
  I2_MAC: the MAC address of the I2_AL3S router reached via I2_WAN_VID on the I2_port (we assume there is a single I2 router MAC address on this interface)
  GW_WAN_port: the port connecting the WAN VLAN to the gateway router (may be the same as GW_DMZ_port)
  GW_WAN_VID: the VID for the WAN VLAN to/from the campus gateway
  GW_DMZ_port: the port connecting the LAN VLAN to the gateway router (may be the same as GW_WAN_port)
  DMZ_VID: the VID for the LAN VLAN (connecting to all Preferred DTN ports)
  GW_DMZ_MAC: the gateway router MAC address on the LAN connected to GW_DMZ_port (may be the same as GW_WAN_MAC)
  GW_WAN_MAC: the gateway router MAC address on the LAN connected to GW_WAN_port (may be the same as GW_DMZ_MAC)
  GW_WAN_group: group ID for the group that forwards to the GW_WAN_port using the GW_WAN_VID
  I2_WAN_group: group ID for the group that forwards to the I2_port using the I2_WAN_VID
  GW_DMZ_group: group ID for the group that forwards to the GW_DMZ_port using the DMZ_VID
  WAN_next_hop_group: group ID for the next hop group to the I2_port using the I2_WAN_VID Variables Used for the Pipeline Description:
  <DTN port>: a port connecting to a Preferred DTN or LAN router
  <DTN IP address>: the IP address or IP subnet for DTN(s) reached via a DTN port
  <WAN IP address>: the IP address of a DTN reached via Internet2 AL3S (I2_port:I2_WAN_VID)
  <DTN MAC address>: the MAC address of a DTN or LAN router on a DTN port
  <DTN_next_hop_group>: a group ID for a next hop group entry to a DTN port Pipeline Metadata:
  SA_CHECK: a flag indicating that the Table 7 key should be build using the IP source address instead of the IP destination address
  group_id: the group_id to be searched in the group table (maybe not new, but set earlier in the pipeline in some cases)

Table 2 Entries
  No I2_port+I2_WAN_VID entry [tc1][tc2]
    (miss) goto_table 3
  No GW_WAN_port+GW_WAN_VID entry [tc4] [tc5bii]
    (miss) goto_table 3
  GW_DMZ_port+DMZ_VID+<DTN MAC address> entries (#(DTN MAC addresses)) [tc3] done
    output:<DTN port>
  No DMZ_VID+GW_DMZ_MAC entry [tc5a][tc5bi][tc6]
    (miss) goto_table 3
  <DTN port>+DMZ_VID+<DTN MAC address> entries ((#(DTN ports)) x #(DTN MAC addresses)) [tc7] done
    output:<DTN port>
  Can also allow VID 4095 (untagged)

Table 3 Entries
  I2_port+I2_WAN_VID entry [tc1][tc2]
    goto_table 5
  GW_WAN_port+GW_WAN_VID entry [tc4] [tc5bii]
    goto_table 5
  <DTN port>+DMZ_VID entries (#(DTN ports)) [tc5a] [tc5bi] [tc6]
    goto_table 5
  Can also allow VID 4095 (untagged)

Table 5 Entries
  I2_port+GW_WAN_MAC entry [tc1][tc2]
    set SA_CHECK flag FALSE
    set group_id=GW_WAN_group
    goto_table 6
  GW_WAN_port+I2 MAC entry [tc4] [tc5bii]
    set SA_CHECK flag TRUE
    set group_id=I2_WAN_group
    goto_table 6
  <DTN port>+GW_DMZ_MAC entries (#(DTN ports)) [tc5a] [tc5bi] [tc5bii] [tc6]
    set SA_CHECK flag FALSE
    set group_id=GW_DMZ_group
    goto_table 6

Table 6 Entries
  IPv4 entry
    if SA_CHECK, build table 7 key with nw_src [tc4] [tc5bii]
    else build table 7 key with nw_dst [tc1][tc2][tc5a] [tc5bi][tc6]
    goto_table 7

Table 7 Entries
  <DTN IP address> entries (#(DTN addresses/prefixes))
    if SA_CHECK output:controller [tc5bii] done*
    else set group_id, <DTN_next_hop_group> [tc1]
    goto_table Group
  <WAN IP address> entries (#(active WAN IP addresses)) [tc5a]
    set group_id=WAN_next_hop_group
    goto_table Group
  Miss entry
    goto_table Group Group Table Entries
  DTN next hop entries (#DTN addresses/prefixes) [tc1] done
    set_field:DMZ_VID->vlan_vid (or strip_vlan)
    set_field:GW_DMZ_MAC->eth_src
    set_field:<DTN MAC address>->eth_dst
    output:<DTN port>

GW_WAN_group entry [tc2] done
  set_field:WAN_VID->vlan_vid
  output:GW_WAN_port
I2_WAN_group entry [tc4] done
  set_field:I2_WAN_VID->vlan_vid
  output:I2_port
GW_DMZ_group entry [tc5bi][tc6] done
  set_field:DMZ_VID->vlan_vid
  output:GW_DMZ_port
WAN_next_hop_group entry [tc5a] done
  set_field:I2_WAN_VID->vlan_vid
  set_field:GW_WAN_MAC->eth_src
  set_field:I2_MAC->eth_dst
  output:I2_port

*[tc5bii] is completed by the Controller sending the packet to I2_port using PACKET_OUT after the WAN address forwarding entry is installed. Alternatively the packet can continue in the pipeline to I2_port and the copy sent to the controller can asynchronously install the routing entry for the WAN address.

What has been described is merely illustrative of the application of principles of embodiments of the present disclosure. Other arrangements and methods can be implemented by those skilled in the art.

For example, although described primarily in the context of methods and systems, other implementations are also contemplated, as instructions stored on a non-transitory processor-readable medium, for example.

The invention claimed is:

1. A method comprising:
receiving data packets at a communication device that is coupled to a network node in a communication network, to a gateway router that is coupled to other network nodes in the communication network, and to a further communication network;
determining for each received data packet whether the received data packet is to be routed toward a destination by the communication device instead of by the gateway router;
routing the received data packet toward the destination by the communication device based on determining that the received data packet is to be routed toward the destination by the communication device instead of by the gateway router; and
switching the received data packet from the communication device to the gateway router to be routed by the gateway router toward the destination based on determining that the received data packet is not to be routed toward the destination by the communication device instead of by the gateway router.

2. The method of claim 1, further comprising:
determining for each received data packet whether the received data packet is received from the gateway router; and
determining that the received data packet is not to be routed toward the destination by the communication device instead of by the gateway router based on determining that the received data packet is received from the gateway router.

3. The method of claim 1, wherein the determining comprises:
determining one or more characteristics of the received data packet;
determining whether the one or more characteristics of the received data packet satisfy a selective routing condition; and
determining that the received data packet is to be routed toward the destination by the communication device instead of by the gateway router based on determining that the one or more characteristics of the received data packet satisfy the selective routing condition.

4. The method of claim 3, wherein the selective routing condition comprises the one or more characteristics of the received data packet matching an entry in a routing table at the communication device.

5. The method of claim 1, wherein the routing comprises consulting a routing table of the communication device, and wherein the method further comprises:
determining whether the received data packet is received from the gateway router;
determining whether a source address in the received data packet received from the gateway router matches a destination address in the routing table; and
populating the routing table with a new entry comprising at least the destination address of the received data packet based on determining that the source address in the received data packet received from the gateway router matches a destination address in the routing table.

6. The method of claim 1, wherein the routing comprises consulting a routing table of the communication device, and wherein the method further comprises:
determining whether the received data packet is received from the network node;
determining whether a source address in the received data packet received from the network node matches a destination address in the routing table; and
populating the routing table with a new entry based on determining that the source address in the received data packet does not match a destination address in the routing table.

7. The method of claim 1, wherein the routing comprises consulting a routing table of the communication device, and wherein the method further comprises:
receiving one or more characteristics of a data flow configured for transfer to or from the network node; and
populating the routing table with a new entry based on the received one or more characteristics.

8. The method of claim 7, wherein the one or more characteristics comprises a destination Internet Protocol (IP) address, and wherein the new entry comprises the destination IP address.

9. The method of claim 1, wherein the routing comprises consulting a routing table of the communication device, and wherein the method further comprises:
receiving an indication that a data flow for which the routing table includes one or more entries has ended; and
removing the one or more entries from the routing table.

10. The method of claim 1, wherein the routing comprises:
rewriting source address information in the received data packet with new source address information associated with the gateway router.

11. The method of claim 1, wherein the routing comprises:
maintaining a current count value, in the received data packet, that indicates a number of times the received data packet is routed.

12. The method of claim 1, wherein the switching comprises:
determining a Media Access Control (MAC) address of the received data packet;

determining an egress port corresponding to the MAC address; and switching the received data packet to the determined egress port.

13. An apparatus comprising:
a network node interface to be coupled to a network node in a communication network;
a gateway router interface to be coupled to a gateway router that is coupled to other network nodes in the communication network;
a network interface to be coupled to communication equipment in a further communication network; and
a selective routing module coupled to the network node interface, to the gateway router interface, and to the network interface, to: receive data packets; to determine for each received data packet whether the received data packet is to be routed toward a destination by the selective routing module instead of by the gateway router; to route the received data packet toward the destination based on determining that the received data packet is to be routed toward the destination by the selective routing module instead of by the gateway router; and to switch the received data packet to the gateway router to be routed by the gateway router toward the destination based on determining that the received data packet is not to be routed toward the destination by the selective routing module instead of by the gateway router.

14. The apparatus of claim 13, wherein the selective routing module is configured to determine for each received data packet whether the received data packet is received from the gateway router, and to determine that the received data packet is not to be routed toward the destination by the selective routing module instead of by the gateway router based on determining that the received data packet is received from the gateway router.

15. The apparatus of claim 13, wherein the selective routing module is configured to, for each received data packet, determine one or more characteristics of the received data packet, determine whether the one or more characteristics of the received data packet satisfy a selective routing condition, and determine that the received data packet is to be routed toward the destination by the selective routing module instead of by the gateway router based on determining that the one or more characteristics of the received data packet satisfy the selective routing condition.

16. The apparatus of claim 15, further comprising:
a memory, coupled to the selective routing module, to store a routing table,
wherein the selective routing condition comprises the one or more characteristics of the received data packet matching an entry in the routing table.

17. The apparatus of claim 13, further comprising:
a memory, coupled to the selective routing module, to store a routing table,
wherein the selective routing module is configured to consult the routing table to route a received data packet that is to be routed toward the destination by the selective routing module,
wherein the selective routing module is further configured to determine for each received data packet whether the received data packet is received from the gateway router; to determine whether a source address in the received data packet received from the gateway router matches a destination address in the routing table; and to populate the routing table with a new entry comprising at least the destination address of the received data packet based on determining that the source address in the received data packet received from the gateway router matches a destination address in the routing table.

18. The apparatus of claim 13, further comprising:
a memory, coupled to the selective routing module, to store a routing table,
wherein the selective routing module is configured to consult the routing table to route a received data packet that is to be routed toward the destination by the selective routing module,
wherein the selective routing module is further configured to determine for each received data packet whether the received data packet is received from the network node; to determine whether a source address in the received data packet received from the network node matches a destination address in the routing table; and to populate the routing table with a new entry based on determining that the source address in the received data packet does not match a destination address in the routing table.

19. The apparatus of claim 13, further comprising:
a memory, coupled to the selective routing module, to store a routing table,
wherein the selective routing module is configured to consult the routing table to route a received data packet that is to be routed toward the destination by the selective routing module,
wherein the selective routing module is further configured to receive one or more characteristics of a data flow configured for transfer to or from the network node coupled to the network node interface, and to populate the routing table with a new entry based on the received one or more characteristics.

20. The apparatus of claim 19, wherein the one or more characteristics comprises a destination Internet Protocol (IP) address, and wherein the new entry comprises the destination IP address.

21. The apparatus of claim 13, further comprising:
a memory, coupled to the selective routing module, to store a routing table,
wherein the selective routing module is configured to consult the routing table to route a received data packet that is to be routed toward the destination by the selective routing module,
wherein the selective routing module is further configured to receive an indication that a data flow for which the routing table includes one or more entries has ended, and to remove the one or more entries from the routing table.

22. The apparatus of claim 13, wherein the selective routing module is configured to rewrite source address information in a received data packet that is to be routed by the selective routing module with new source address information associated with the gateway router.

23. The apparatus of claim 13, wherein the selective routing module is configured to maintain a current count value, in a received data packet that is to be routed by the selective routing module, that indicates a number of times the received data packet is routed.

24. The apparatus of claim 13, wherein the selective routing module is configured to determine a Media Access Control (MAC) address of a received data packet that is to be switched to the gateway router, to determine an egress port corresponding to the MAC address, and to switch the received data packet to the determined egress port.

25. A non-transitory processor-readable medium storing instructions which, when executed by one or more processors, cause the one or more processors to perform a method that comprises:

receiving data packets at a communication device that is coupled to a network node in a communication network, to a gateway router that is coupled to other network nodes in the communication network, and to a further communication network;

determining for each received data packet whether the received data packet is to be routed toward a destination by the communication device instead of by the gateway router;

routing the received data packet toward the destination by the communication device based on determining that the received data packet is to be routed toward the destination by the communication device instead of by the gateway router; and switching the received data packet from the communication device to the gateway router to be routed by the gateway router toward the destination based on determining that the received data packet is not to be routed toward the destination by the communication device instead of by the gateway router.

\* \* \* \* \*